(12) United States Patent
Schmidt et al.

(10) Patent No.: US 6,737,638 B2
(45) Date of Patent: May 18, 2004

(54) GEAR-REDUCTION DEVICE, PARTICULARLY FOR MEASURING AND TRANSMITTING ROTARY AND SWIVEL MOVEMENTS

(75) Inventors: Norbert Schmidt, Seebach (DE); Jürgen Kieselbach, Emsetal (DE)

(73) Assignee: PWB-Ruhlatec Industrieprodukte GmbH, Seebach (DE)

( * ) Notice: Subject to any disclaimer, the term of this patent is extended or adjusted under 35 U.S.C. 154(b) by 389 days.

(21) Appl. No.: 09/742,671

(22) Filed: Dec. 20, 2000

(65) Prior Publication Data

US 2001/0011485 A1 Aug. 9, 2001

(30) Foreign Application Priority Data

Dec. 22, 1999 (DE) .......................................... 199 62 067

(51) Int. Cl.[7] ................................................ G01D 5/34
(52) U.S. Cl. .......................... 250/231.15; 250/231.13; 33/1 PT; 74/33
(58) Field of Search ........................ 250/231.13, 231.14, 250/231.15, 231.16, 231.17, 231.18; 33/1 N, 1 PT; 73/118.1, 1.75, 1.79; 116/31; 341/11, 13; 340/509; 74/25, 29, 33

(56) References Cited

U.S. PATENT DOCUMENTS

| | | | | | |
|---|---|---|---|---|---|
| 1,809,934 A | * | 6/1931 | Glennon | ....................... | 116/31 |
| 2,282,189 A | * | 5/1942 | Jackson | ....................... | 116/31 |
| 2,707,451 A | * | 5/1955 | Brink | ........................... | 116/31 |
| 5,610,577 A | * | 3/1997 | Hwang | ....................... | 340/465 |

FOREIGN PATENT DOCUMENTS

| GB | 2065577 A | 7/1981 |
|---|---|---|
| JP | 58170673 A | 10/1983 |

* cited by examiner

Primary Examiner—Edward J. Glick
Assistant Examiner—Chih-Cheng Glen Kao
(74) Attorney, Agent, or Firm—Darby & Darby

(57) ABSTRACT

A gear-reduction device for measuring and transmitting the movements of a rotary object has a sequential arrangement of wheel/pinion pairs. Each wheel/pinion pair consists of a gear wheel and a pinion that are rigidly connected to a common gear axle. At least part of the gear wheels lie in different parallel planes that are inclined at an oblique angle in relation to the plane of rotation of the rotary object. The gear wheels are of equal diameter, and each of the pinions drives the next following gear wheel. The first wheel in the sequence of wheel/pinion pairs is driven by the rotary object, while the last of the pinions drives a swivel-mounted optical angle-measuring device.

6 Claims, 2 Drawing Sheets

GEAR-REDUCTION DEVICE, PARTICULARLY FOR MEASURING AND TRANSMITTING ROTARY AND SWIVEL MOVEMENTS

BACKGROUND OF THE INVENTION

The invention relates to a gear-reduction device for measuring and transmitting rotary and swivel movements. The gear-reduction device is a type of transmission with a plurality of wheel/pinion pairs, i.e., unitary elements in which a gear wheel and a pinion gear are rigidly mounted on a common gear axle. When coupled to a rotary object whose movement is to be measured, the gear-reduction device produces an output angle of rotation that is reduced in relation to the angular movement of the rotary object, whereby the measuring range is expanded.

To measure angles of rotation and numbers of revolutions, it has so far been customary to use gears of different diameters and combine them in a multi-stage gearbox with a high ratio of gear reduction or amplification.

One disadvantage of the kind of arrangement just described is the relatively large profile height H, which is necessary because the wheels in wheel/pinion gearboxes have to be arranged at individually staggered positions. In addition, using non-uniform wheel/pinion pairs causes high tooling costs and increases the costs for parts inventory and assembly.

OBJECT OF THE INVENTION

The object of the present invention is to avoid the drawbacks of the known gearboxes that are used to measure angles of rotation and to count numbers of revolutions and to develop a new gear-reduction device for measuring and transmitting rotary and swivel movements. Desired characteristics are that the device be suitable for integration into existing systems even under the severest installation constraints, for example in steering mechanisms of automobiles, and that the device be manufacturable with low tooling costs and an inventory of fewer different parts.

SUMMARY OF THE INVENTION

To meet the foregoing objective, the invention provides a gear-reduction device for measuring and transmitting rotary and swivel movements. The device has multiple wheel/pinion pairs, i.e., unitary elements in which a gear wheel and a pinion gear are rigidly mounted on a gear axle. When coupled to a rotary object whose angle of rotation is to be measured, the device produces at its output an amount of angular movement that is reduced in relation to the movement performed by the rotary object, whereby the measuring range is expanded. The device has a geometry where the gear wheels of different wheel/pinion pairs occupy different gear-wheel planes. The invention is advantageously distinguished in that at least a part of the gear-wheel planes are parallel to each other, but inclined at an oblique angle in relation to the plane of rotation of the rotary object. Furthermore in the inventive device, the wheels of the different wheel/pinion pairs are of equal diameter; the wheel/pinion pairs follow each other in a sequence where the pinion of each pair is engaged in the wheel of the next following pair; the wheel of the first pair in the sequence, i.e., the input wheel, is positively engaged and driven by the rotary object; and the pinion of the last pair or output pair, through a positive motion-transfer connection, controls the swivel movement of an optical angle-measuring device.

In one embodiment of the invention, the wheel plane of the input wheel is parallel to the plane of rotation of the rotary object.

In another embodiment, the wheel plane of the output pair is parallel to the swivel-motion plane of the optical angle-measuring device.

In a further embodiment, all wheel planes are parallel to each other and inclined in relation to the plane of rotation of the rotary object.

Also within the scope of the invention is an embodiment, where the input wheel is kinematically coupled to a driving unit and the output pair has a central output shaft transmitting movement to a driven device.

A further developed version of the preceding embodiment has a base plate and a cover plate. The driving shaft or input shaft and the driven shaft or output shaft of the device run in bearings mounted in the base plate and the cover plate; the gear-reduction device is flange-mounted on the driving unit and forms a unitary module with the driving unit.

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

The following detailed description relates to an embodiment of the invention as illustrated in the attached drawings wherein.

DETAILED DESCRIPTION OF A PREFERRED EMBODIMENT

Figure 1:
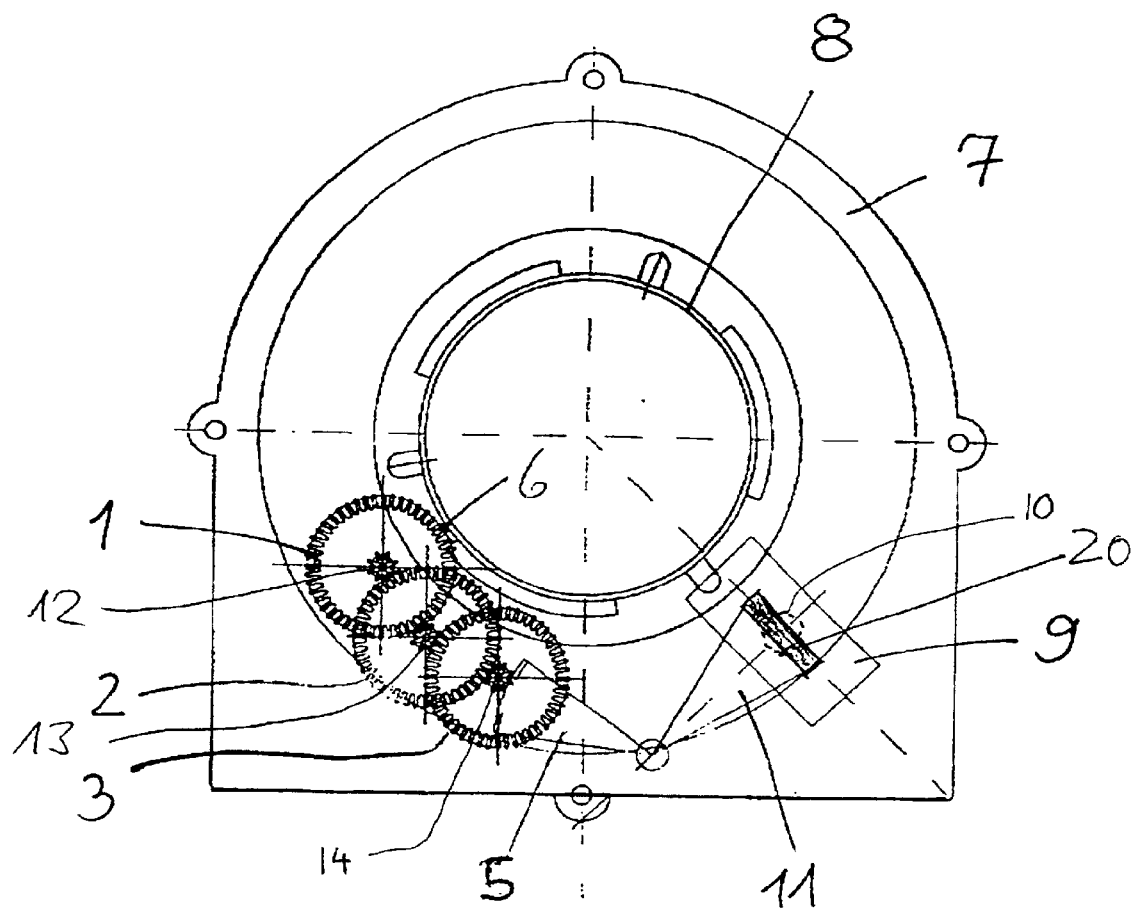
FIG. 1 represents a frontal view of a steering-mechanism housing with a gear-reduction device according to the invention.

In FIG. 1, a steering-mechanism assembly 7 is shown in a viewing direction parallel to the steering column. A driving gear 6 transmits the rotary movement of the steering column 8 to the wheel/pinion pairs 1, 2, 3. The pinion 14 of the last wheel/pinion pair 3 has a positive, motion-transmitting engagement to a swivel lever 5 that is connected to an optical angle-measuring device 20, so that a rotation of the pinion 14 is converted to a swivel movement of the optical angle-measuring device 20 within a sector range 11. The angle-measuring device 20 intercepts and modulates a light beam emitted by a diode 10 (located in front of the device 20) before the modulated light falls on the sensor 9 (located behind the device 20).

Figure 2:
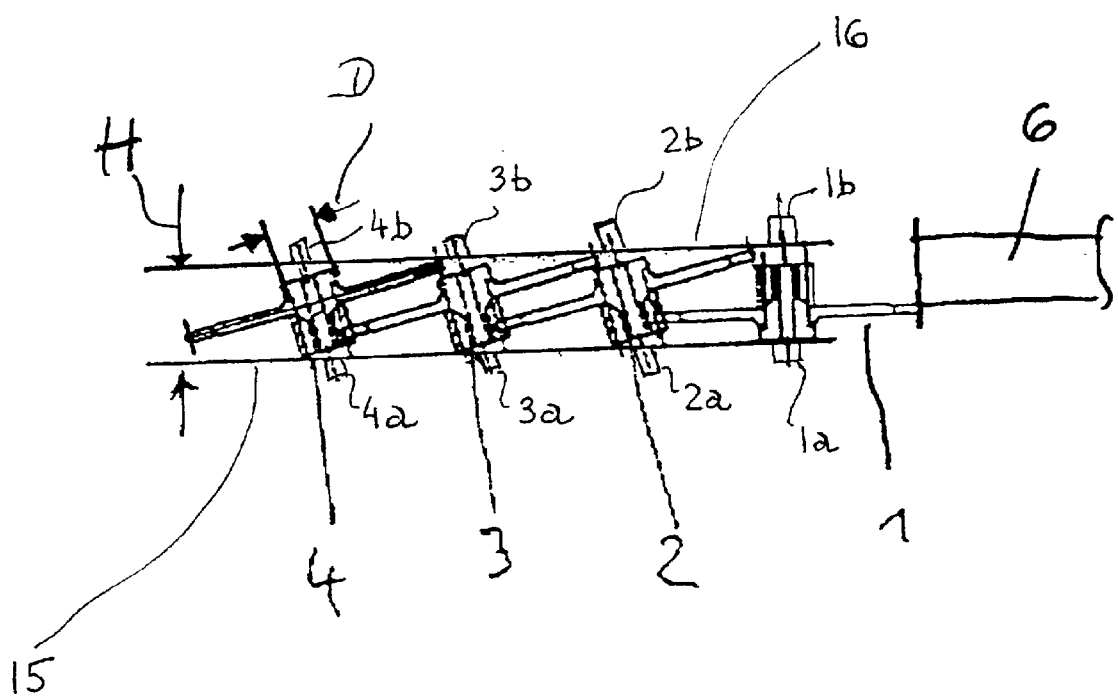
FIG. 2 represents a side view of a detail segment of the gear-reduction device.

FIG. 2 illustrates a side view of a gear-reduction device assembly that is analogous to the arrangement shown in FIG. 1. A driving gear 6 transmits rotary motion to a sequence of four wheel/pinion pairs identified by reference numerals 1 through 4, respectively. The axes of rotation of wheel/pinion pairs 2 to 4 are parallel to each other but oriented at an oblique angle in relation to the plane of rotation of the driving gear 6. The wheel/pinion pair 1, on the other hand, is not set at an angle, but has the same plane of rotation as the driving gear 6.

With the gear-reduction device of the present invention, the measuring range for an angle of rotation or swivel angle can be strongly expanded. The wheel/pinion pairs 1 through 4 run in bearings 1a, 2a, 3a, 4a mounted in a base plate 15 and bearings 1b, 2b, 3b, 4b mounted in a cover plate 16. The base plate 15 and the cover plate 16 can be configured as two housing halves spaced from each other at only a very small distance. For example, the inside profile height H between the housing halves could be equal to 1.5 times the hub diameter D of the wheel/pinion pairs. The gear-reduction device can be flange-mounted on a driving unit such as the steering-mechanism assembly 7 of FIG. 1, so that the gear-reduction device forms a unitary module with the driving unit.

A gear-reduction device designed for measuring and rotary drive applications can be incorporated, e.g., in a steering angle sensor that measures the absolute angular position of a steering wheel of a motor vehicle. The angle-sensor arrangement for this application has a first sensor unit with a first rotor coupled directly to the rotary motion of the steering wheel and carrying a first angular measurement scale represented in a coded format. A first stationary detecting device reads the rotor-angle code within a segmental portion of the total angular range of the steering wheel. Connected to the first rotor by way of a gear-reduction device is a second rotor belonging to a second sensor unit. The second rotor, like the first, carries a coded angular measurement scale, which is read by a second stationary detecting device covering the entire steering-angle range.

The first detection device can be configured as a sensor array, i.e., a multitude of sensor elements that are arranged adjacent to each other. The sensor-array concept is suitable for reading the code of the first rotor as well as for reading the code of the second rotor. The first rotor is designed as an encoder disc, and the sensor array is a linear arrangement of sensor elements extending lengthwise in the radial direction of the encoder disc, with the sensor elements facing the flat surface of the disc that carries the encoded angular measuring scale.

The second rotor is kinematically coupled to the first rotor by way of a gear-reduction device of the present invention. The gear wheel of a first wheel/pinion pair meshes with a tooth profile of the first rotor. The pinion of the first wheel/pinion pair drives subsequent wheel/pinion pairs. The pinion of the last wheel/pinion pair in the sequence is the output gear, transmitting its rotation to the second sensor unit by way of a swivel lever engaging a claw of a swivel arm that carries the encoded angular scale of the second sensor unit.

The kinematics of the inventive gear-reduction arrangement can be explained in detail by referring to FIG. 1. When the input gear wheel 1 is set in motion by a driving unit or, more specifically, by the object whose position is to be measured, e.g., the steering column 8, the pinion 12 at the hub of the input gear wheel 1 will share the rotation of the steering column.

The pinion 12, in turn, communicates the rotary movement to the gear wheel 2 with the pinion 13 which, in its turn, drives the output gear wheel 3.

The pinion 14 shares a central output shaft with the output gear wheel 3 and communicates the rotary movement to a driven device, e.g., the swivel lever 5, which carries an optical angle-measuring device 20 sweeping across an angular range 11. The gear-reduction device according to the invention is designed as a compact unit that can be incorporated in a variety of measuring units and drive units.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A measuring apparatus for measuring and transmitting rotary and swivel movements, comprising: a gear-reduction device comprising a plurality of wheel/pinion pairs, each wheel/pinion pair having a gear axle, a gear wheel, and a pinion gear, the gear wheel and the pinion gear being rigidly connected to the gear axle; a rotary object that is coupled to said near-reduction device, that moves in a plane of rotation, and whose movement is to be measured within a measuring range; and an optical angle-measuring device; wherein said gear-reduction device produces an output motion that is reduced in relation to the movement of the rotary object, thereby expanding the measuring range; wherein the gear wheels of the different wheel/pinion pairs lie in different gear-wheel planes, at least a part of the gear-wheel planes being parallel to each other and inclined in relation to the plane of rotation of the rotary object;

the gear wheels of the different wheel/pinion pairs are of equal diameter;

the wheel/pinion pairs follow each other in a sequence where the pinion gear of each wheel/pinion pair is engaged in the gear wheel of the next following wheel/pinion pair;

the gear wheel of the first wheel/pinion pair in the sequence is an input wheel, being positively engaged and driven by the rotary object;

the gear wheel of the last wheel/pinion pair in the sequence is an output wheel, the pinion of the last wheel/pinion pair being positively engaged and driving the optical angle-measuring device by rotary swivel motion in a swivel-motion plane;

the gear-wheel plane of the input wheel is parallel to the plane of rotation of the rotary object; and the gear-wheel plane of the output wheel is parallel to the swivel-motion plane of the optical angle-measuring device.

2. The measuring apparatus of claim 1, wherein the input wheel has an input shaft and is kinematically coupled to a driving unit, and the output wheel has a central output shaft to transmit movement to a driven device.

3. The measuring apparatus of claim 2, further comprising a base plate, a cover plate, and a plurality of rotary bearings mounted in the base plate and the cover plate, wherein at least the input shaft and the central output shaft run in the rotary bearings and wherein the gear-reduction device is flange-mounted on the driving unit to form a unitary module with the driving unit.

4. A measuring apparatus for measuring and transmitting rotary and swivel movements, comprising: a gear-reduction device comprising a plurality of wheel/pinion pairs, each wheel/pinion pair having a gear axle, a gear wheel, and a pinion gear, the gear wheel and the pinion gear being rigidly connected to the gear axle; a rotary object that is coupled to said gear-reduction device, that moves in a plane of rotation, and whose movement is to be measured within a measuring range; and an optical angle-measuring device; wherein said gear-reduction device produces an output motion that is reduced in relation to the movement of the rotary object, thereby expanding the measuring range; wherein the gear wheels of the different wheel/pinion pairs lie in different gear-wheel planes;

the gear wheels of the different wheel/pinion pairs are of equal diameter;

the wheel/pinion pairs follow each other in a sequence where the pinion gear of each wheel/pinion pair is engaged in the gear wheel of the next following wheel/pinion pair;

the gear wheel of the first wheel/pinion pair in the sequence is an input wheel, being positively engaged and driven by the rotary object;

the gear wheel of the last wheel/pinion pair in the sequence is an output wheel, the pinion of the last wheel/pinion pair being adapted positively engaged and driving the optical angle-measuring device by rotary swivel motion in a swivel-motion plane;

the gear-wheel plane of the output wheel is parallel to the swivel-motion plane of the optical angle-measuring device; and all gear-wheel planes are parallel to each other and inclined at an oblique angle in relation to the plane of rotation of the rotary object.

5. The measuring apparatus of claim 4, wherein the input wheel has an input shaft and is kinematically coupled to a driving unit, and the output wheel has a central output shaft to transmit movement to a driven device.

6. The measuring apparatus of claim 5, further comprising a base plate, a cover plate, and a plurality of rotary bearings mounted in the base plate and the cover plate, wherein at least the input shaft and the central output shaft run in the rotary bearings and wherein the gear-reduction device is flange-mounted on the driving unit to form a unitary module with the driving unit.

* * * * *